(12) United States Patent
Shioiri et al.

(10) Patent No.: US 7,178,508 B2
(45) Date of Patent: Feb. 20, 2007

(54) FUEL INJECTION NOZZLE OF ENGINE

(75) Inventors: Motoyuki Shioiri, Osaka (JP); Satoshi Iwata, Osaka (JP); Akihiko Motoki, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 640 days.

(21) Appl. No.: 10/626,568

(22) Filed: Jul. 25, 2003

(65) Prior Publication Data

US 2005/0076886 A1    Apr. 14, 2005

Related U.S. Application Data

(63) Continuation of application No. PCT/JP02/00397, filed on Jan. 21, 2002.

(30) Foreign Application Priority Data

| Jan. 25, 2001 | (JP) | .............................. 2001-16615 |
| Jan. 25, 2001 | (JP) | .............................. 2001-16616 |
| Jan. 25, 2001 | (JP) | .............................. 2001-16617 |

(51) Int. Cl.
*F02M 37/04* (2006.01)

(52) U.S. Cl. ..................................... 123/470

(58) Field of Classification Search ................. 123/470, 123/90.23, 90.39, 468, 469
See application file for complete search history.

(56) References Cited

U.S. PATENT DOCUMENTS

| 4,046,128 | A | * | 9/1977 | Formia ..................... 123/195 C |
| 4,384,557 | A | * | 5/1983 | Johnson .................... 123/198 D |
| 4,448,166 | A | * | 5/1984 | Amemori et al. ............ 123/445 |
| 4,565,320 | A | * | 1/1986 | Taniguchi et al. ............. 239/90 |
| 4,721,075 | A | * | 1/1988 | Kasai ...................... 123/90.23 |
| 5,125,383 | A | * | 6/1992 | Meier et al. ................. 123/470 |
| 5,609,134 | A | * | 3/1997 | Schmidt et al. .............. 123/322 |
| 5,697,344 | A | * | 12/1997 | Ikari ........................... 123/468 |
| 6,237,571 | B1 | * | 5/2001 | Harrison ..................... 123/469 |
| 6,269,796 | B1 | * | 8/2001 | Mitchell ..................... 123/468 |
| 6,394,071 | B2 | * | 5/2002 | Nitta et al. .................. 123/456 |

FOREIGN PATENT DOCUMENTS

| JP | 4-109471 | 9/1992 |
| JP | 6-43261 | 6/1994 |
| JP | 6-43262 | 6/1994 |
| JP | 8-121285 | 5/1996 |
| JP | 9-88765 | 3/1997 |
| JP | 10-9092 | 1/1998 |
| JP | 10-213051 | 8/1998 |
| JP | 2000-140729 | 5/2000 |

OTHER PUBLICATIONS

International Search Report for Int'l Appl. No. PCT/JP02/00397, dated Apr. 30, 2002, 1 page.

* cited by examiner

*Primary Examiner*—Thomas Moulis
(74) *Attorney, Agent, or Firm*—Sterne, Kessler, Goldstein & Fox P.L.L.C.

(57) ABSTRACT

A fuel injection nozzle of an engine used to inject fuel oil into the combustion chamber of each cylinder of a diesel engine and fixedly attached to a cylinder head (1) by a fuel injection nozzle retainer (15) supported by a valve arm shaft (11) for supporting a valve arm (14) and an energizing member (35) energizing the fuel injection nozzle retainer (15) in axial direction.

7 Claims, 12 Drawing Sheets

FUEL INJECTION NOZZLE OF ENGINE

BACKGROUND OF THE INVENTION

1. Field of the Invention

The present invention relates to a structure of a fuel injection nozzle attached into a cylinder head of an engine.

2. Related Art

Conventionally, in an engine such as a 2-valve type engine wherein each cylinder has one inlet valve and one exhaust valve, or a 4-valve type engine wherein each cylinder has two inlet valves and two exhaust valves, a fuel injection valve is (fuel injection valves are) inserted downward into a cylinder head. A fuel injection nozzle retainer, which may be made of a block member, axially presses the fuel injection nozzle and fixes it into the cylinder head. The fuel injection nozzle retainer is fastened at left and right ends thereof to the cylinder head by bolts.

For example, as disclosed in the Japanese Laid Open Gazette Hei. 8-121285, a holder is fastened at left and right ends thereof to a cylinder head by bolts so as to axially press a fuel injection nozzle, thereby locating and fixing it at an appointed place in the cylinder block.

Also, as disclosed in the Japanese Laid Open Gazette Hei. 9-88765, a fixture is fastened to a cylinder block by bolts so as to fix a fuel injection nozzle into the cylinder block.

A conventional engine constructed in this way is so laterally elongated (in the longish direction of its cylinder head) as to appropriate for a fuel injection nozzle retainer which is fastened at left and right ends thereof to the cylinder head 11v bolts. However, with the recent progress of miniaturization and cost saving of engines, limitation of space and cost comes to be required for mounting the fuel injection nozzle retainer, Especially, in the case of 4-valve type engine, the fuel injection nozzle is necessarily arranged in the valve arm room because it requires to be substantially vertically inserted into the cylinder head at the substantially middle portion between inlet and exhaust valves.

In this case, the fuel injection nozzle retainer for pressing down the fuel injection nozzle is supported at one, end thereof on a vale arm shaft, thereby being arranged in the limited inner space of the valve arm room. On one side of the fuel injection nozzle retainer for each cylinder, the valve arm shaft supports the inlet valve, and on the other side, the valve arm shaft supports the exhaust valve. For example, as disclosed in Japanese Laid Open Gazette 2001-140729, a retainer is extended from the fuel injection nozzle to the valve arm shaft so as to press down and fix the fuel injection nozzle. As disclosed in this reference, while one end of the fuel injection nozzle retainer serves as a fulcrum, the other end presses down the fuel injection nozzle, and the valve arm shaft is fittingly provided thereon with inlet and exhaust valve arms on axially opposite sides thereof with respect to the retainer.

In this 4-valve type engine, shaking of the fuel injection nozzle retainer rotatably supported on the valve arm makes it difficult to locate the valve arm casing on the cylinder head, thereby spoiling facility for assembly of the valve arm casing.

Furthermore, if a cylinder boa pitch (a distance of inlet and exhaust valves) varies according to variation of engines, valve arms for inlet valves and exhaust valves must be prepared in various forms corresponding to variation of cylinder boa pitches of engines, thereby increasing costs.

A fuel pipe is inserted from outside into the valve arm room and connected top the fuel injection nozzle so as to supply the fuel injection nozzle with pressured fuel.

The fuel pipe comprises an inner pipe arranged in the valve arm room formed in the valve arm casing, and outer pipe arranged outside the valve arm casing. A pipe joint including a high-pressured seal member is screwed into a side surface of the valve arm casing so as to connect the inner pipe and the outer pipe therethrough.

While the fuel pipe comprises the inner pipe and the outer pipe connected to each other through the pipe joint, a fuel back pipe extends outward from the valve arm casing through another pipe joint screwed into a side surface of the valve arm casing. The valve arm casing is necessarily bored so as to form female screws for the respective pipe joints for conducting the, fuel pipe and the fuel back pipe, thereby increasing the number of manufacturing processes and parts.

SUMMARY OF THE INVENTION

According to the present invention, a fuel injection nozzle of an engine is fixed into a cylinder head by a fuel injection nozzle retainer supported by a support shaft which also supports valve arms and an energizing member for axially energizing the fuel injection nozzle retainer.

Therefore, rotation of the fuel injection nozzle retainer is restrained by energizing force of the energizing member.

When the valve arm casing assembled with the support shaft is settled on the cylinder head, the fuel injection nozzle retainer disposed on the support shaft does not shake, thereby facilitating location of the valve arm casing on the cylinder head. Moreover, the power of the energizing member enables locating the flue injection nozzle retainer at the appointed place in axial direction.

According to the present invention, an interval between the inlet valve arm and the exhaust valve arm is adjustable by the fuel injection nozzle retainer and the energizing member, while the inlet valve arm is arranged on one side of the fuel injection nozzle retainer and the exhaust valve arm is arranged on side of the fuel injection nozzle retainer.

Therefore, a common valve arm can be used among various engines having difficult cylinder boa pitches.

Providing variously shaped fuel injection nozzle retainers made of inexpensive sheet metal, while unifying the shape of valve arm made by casting, can adjust the interval between the inlet valve arm and the exhaust valve arm more economically than providing valve arms having different shapes.

According to the present invention, a fuel injection nozzle of an engine is fixed into a cylinder bead by a fuel injection nozzle retainer, which straddles a head bolt fastening the cylinder head onto a cylinder block and is joined to the cylinder head.

Therefore, the fuel injection nozzle retainer directly contacts with the cylinder head without interfering with the head bolt so as to be surely fixed in the cylinder head, while saving a space for mounting the fuel injection nozzle retainer, and while saving costs for an additional member for supporting the fuel injection nozzle retainer.

Moreover, the fuel injection nozzle retainer is economically made of a metal plate by simple processes such as forming in the metal thin plate with holes for retaining the valves, a dent for straddling the head bolt, and holes for fixation.

According to the present invention, a fuel injection nozzle of an engine is fixed into a cylinder head by a fuel injection nozzle retainer, which is supported at one end thereof by a head bolt fastening the cylinder head onto a cylinder block.

Therefore, it is not necessary to ensure a portion for supporting the fuel injection nozzle retainer on the top surface of cylinder head, thereby further reducing a space for arranging the fuel injection nozzle retainer, and saving cost lot providing a separate member for supporting the, fuel injection nozzle.

Moreover, the fuel injection nozzle retainer is economically made of a metal plate by simple processes such as forming in the metal thin plate with hole, for retaining the valves, a projecting portion, and holes for fixation.

According to the present invention, a projection formed on an end of the fuel injection nozzle retainer is fit into a dented top of the head bolt.

Therefore, in the state that a projection of the fuel injection nozzle retainer fits to the top (the upper surface of head) of the head bolt, the fuel injection nozzle retainer is stably fixed on the cylinder head without slipping relative to the cylinder head, thereby enabling sure settling the fuel injection nozzle.

According to the present invention, a fuel injection nozzle of an engine is supplied with fuel through a fuel pipe which penetrates a valve arm casing arranged above a cylinder head and containing valve arms and the fuel injection nozzle.

Therefore a pipe joint is unnecessary to be screwed into a side surface portion of the valve arm casing so as to connect a fuel pipe outside the valve arm room to a fuel pipe in the valve arm room, thereby reducing the number of parts to be attached to the valve arm casing.

Also, the valve arm casing is unnecessary to be formed with a female screw casing, thereby being simplified in shape and reduced in cost.

Moreover, a fuel pipe comprises the outer fuel pipe and the inner fuel pipe connected to each other through a high-pressured seal member which ensures seal of this connection in the fuel pipe by itself so as to enhance the reliability over fuel leak.

According to the present invention, the valve arm casing is provided at a portion thereof penetrated by the fuel pipe with a seal member for sealing the fuel pipe and with a notch applied for making a gap between the seal member and the penetrated portion of vale arm casing.

Therefore, in order to remove the seal member, a tool may be previously inserted into the notch so as to slightly pry out the high-pressured seal member before removing it, thereby enhancing efficiency of the removing work.

BRIEF DESCRIPTION OF THE DRAWINGS/FIGURES

DETAILED DESCRIPTION OF THE INVENTION

Detailed description will be given on the present invention with reference to attached drawings.

A valve arm room of an engine, having a fuel injection nozzle retainer for fixing the fuel injection nozzle into the cylinder head according to the present invention will be described.

First description will be given on a structure of a valve arm room of a 4-valve type engine wherein each cylinder has two inlet valves and two exhaust valves.

Figure 1:
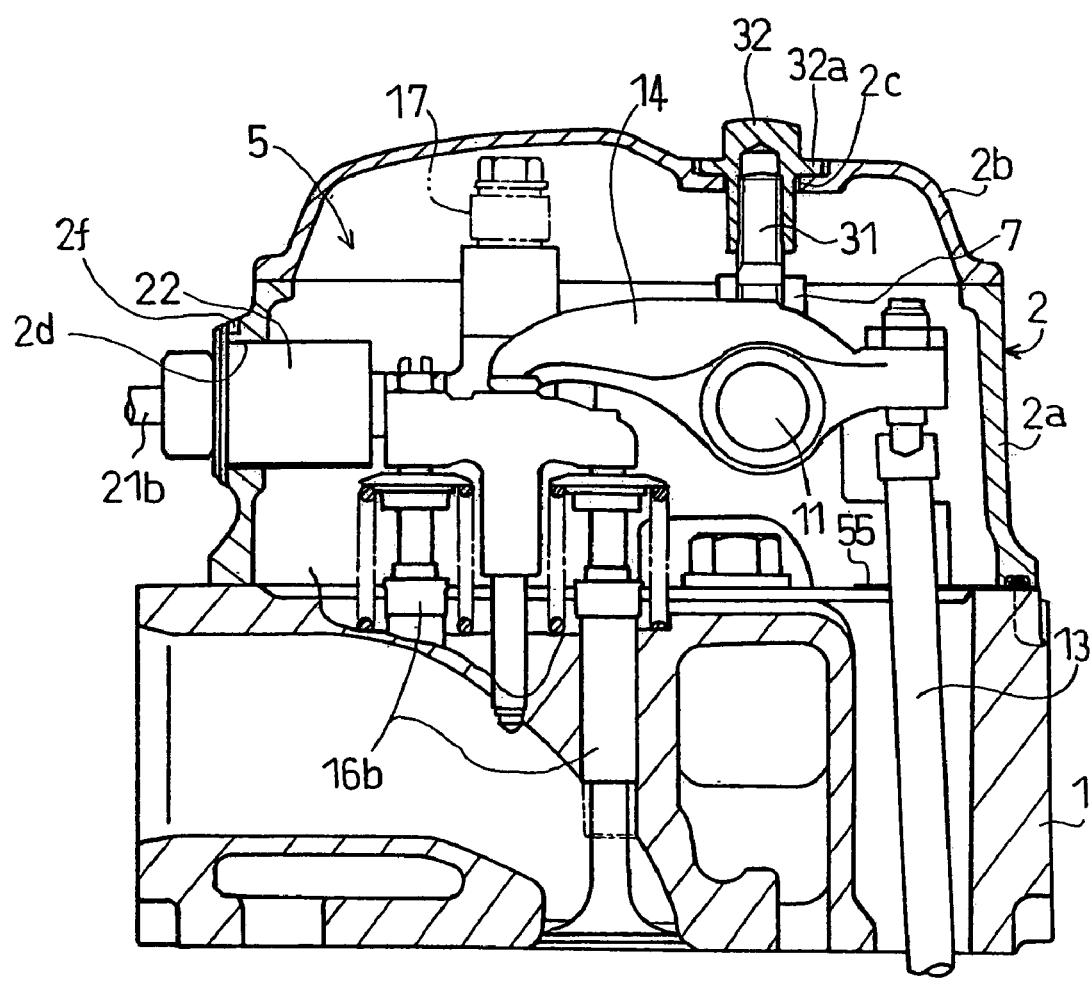
FIG. 1 is a sectional side view of a valve arm room according to the present invention.
Figure 2:
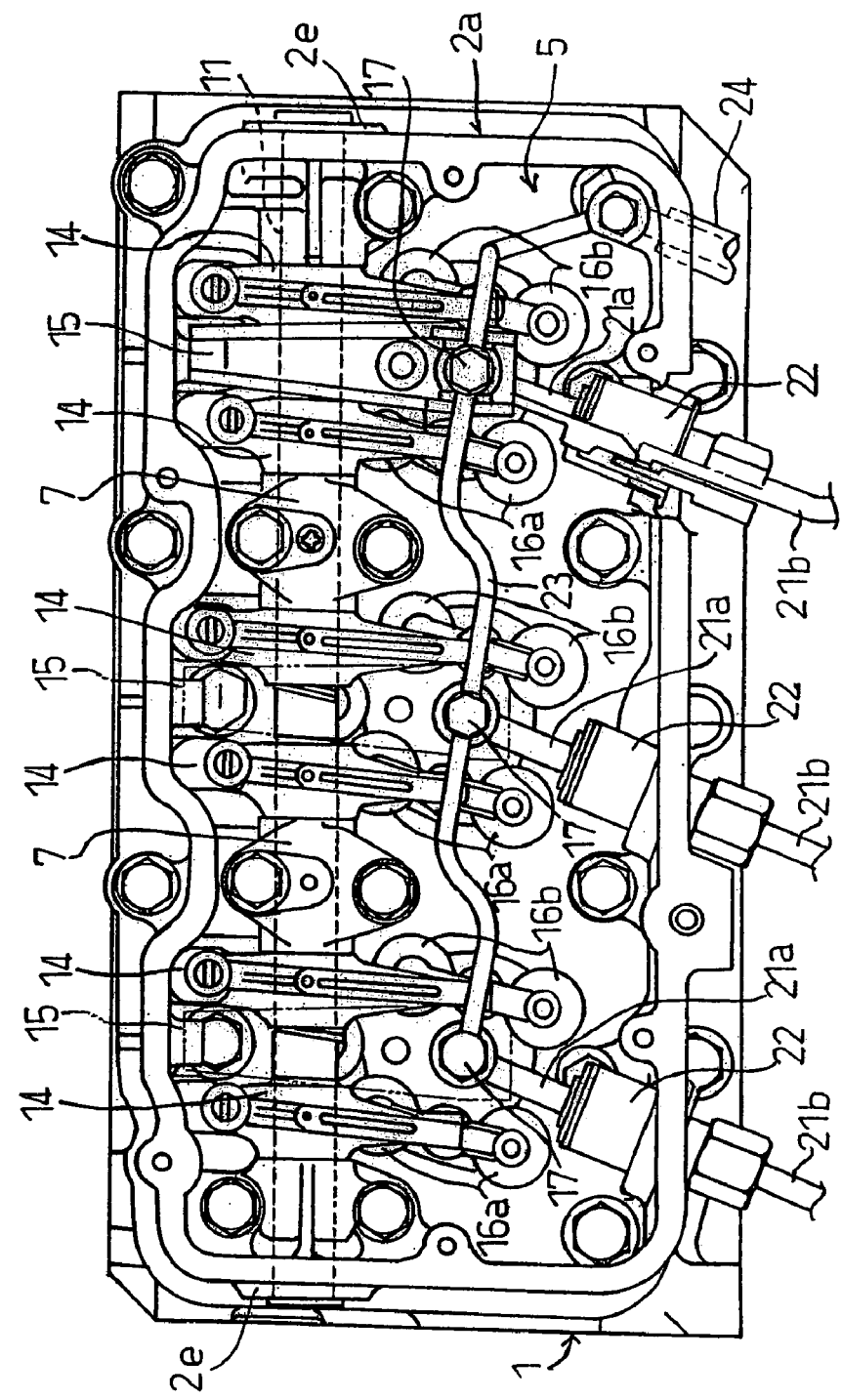
FIG. 2 is a plan view of the same.

As shown in FIGS. 1 and 2, a valve arm casing 2 is arranged above a cylinder head 1 of an engine so as to constitute a valve room 5. For example, the valve arm casing 2 is composed of an upper valve arm casing 2b and a lower valve arm casing 2a.

In this embodiment, for example, the 4-valve type engine has three cylinders, wherein each cylinder has two inlet valves and two exhaust valves.

Moreover, the engine is of the OHV type. In the valve arm room 5 are disposed upper ends of pairs of inlet valves 16a and pairs of exhaust valves 16b, tipper ends of push rods 13, valve arms 14, fuel injection nozzles 17, and so on. The valve arms 14 are rotatably supported on a valve arm shaft 11 in the valve arm room 5.

The valve arms 14 are provided to each pair of inlet valves 6a and to each pair of exhaust valves 16b, respectively. Each of the valve arms 14 is swung by vertically moving the corresponding push rod 13 so as to open and shut the inlet valves 16a, 16a or the exhaust valves 16b, 16b, respectively.

When viewed in plan, each of the fuel injection nozzles 17 is arranged at the substantially center between each pair of inlet valves 16a and each pair of exhaust valves 16b, and inserted into the cylinder head 1 in the substantially vertical direction. Fuel injection nozzle retainers 15 press down the respective fuel injection nozzles 17 so as to locate them at appointed places in the vertical direction.

Each of the fuel injection nozzle retainers 15 is rotatably supported on the valve arm shaft 11, and arranged between the valve arm 14 of the pair of inlet valves 10a and the valve arm 14 of the pair of exhaust valves 16b.

Fuel pipes 21 are led into the valve arm room 5 from the outside and connected to the respective fuel injection nozzles 17 so as supply them with high-pressured fuel. Each of the fuel pipes 21 comprises an inner fuel pipe 21a, which is arranged in the valve arm room 5, and an outer fuel pipe 21b, which is arranged outside the valve arm room 5. The inner pipe 21a and the outer pipe 21b are connected to each other through a high-pressured seal member 22 in a side surface of the lower valve arm casing 2a.

The fuel injection nozzles 17 provided to the respective cylinders are mutually connected by a fuel back pipe 23 so as to return excessive fuel therefrom through the fuel back pipe 23 and an outer fuel back pipe 24 to a fuel tank Fuel pipe holes 2*d* are formed in the side surface of the lower valve arm casing 2*a*, and the fuel pipes 21 pass through the respective, fuel pipe hole 2*d*. The, high-pressure seal members 22 are removably fit in the respective fuel pipe holes 2*d*, The fuel pipe holes 2*d* formed through the side surface of the lower valve arm casing 2*a* for passing the respective fuel pipes 21 make it unnecessary to screw pipe joints into the side surface of the lower valve arm casing 2*a* so as to connect the inner fuel pipes 21*a* to the respective outer fuel pipes 21*b*, thereby reducing the number of parts attached to the lower valve arm casing 2*a*. Also, the fuel pipe holes 2*d* save a process for making female screws within the lower valve arm casing 2*a* so as to simplify the shape of the lower valve arm casing 2*a* and to reduce the number of processes. Furthermore, each of the fuel pipes 21 is sealed at the joint portion thereof between the inner fuel pipe 21*a* and the outer fuel pipe 21*b* with the high-pressured seal member 22 so as to enhance the reliability thereof over fuel leak.

In the valve arm room 5, a plurality of valve arm shaft supporters 7 for supporting the valve arm shaft 11 are fixed on the top surface of cylinder head 1. The valve arm shaft 11 is supported by the valve arm shaft supporters 7 and the side surfaces of lower valve arm casings 2*a*. Bolts 31 are screwed downward into the respective valve arm shaft supporters 7 and exposed at heads thereof above the valve arm shaft supporters 7. Each of the valve arm shaft supporters 7 is, for example, arranged at each gap between neighboring cylinders.

The upper valve arm casing 2*b* is bored with fixation holes 2*c* at points corresponding to the respective valve arm shaft supporters 7. Retaining nuts 32 are downwardly inserted into the respective fixation holes 2*c* from the outside above the upper valve arm casing 2*b* so as to be screwed around the respective upper portions of bolts 31.

By tightly screwing the retaining nut 32 around the bolt 31, a flange 32*a* of the retaining nut 32, which is fit on the peripheral edge of the fixation hole 2*c*, presses (town the lower valve arm casing 2*b*, thereby fixing the upper valve arm casing 2*b* onto the cylinder head 1 together with the lower valve arm casing 2*a* arranged below the upper valve arm casing 2*b*.

Namely, the lower valve arm casing 2*a* is fixed onto the cylinder head 1 through the upper valve arm casing 2*b* which is pressed down by the retaining nuts 32 tightly fastened on the respective bolts 31.

Therefore, by loosening and removing the retaining nuts 32 from the respective bolts 31 and removing the upper valve arm casing 2*b*, as shown FIG. 2, the valve arm room 5, which has been enclosed with the upper and lower valve arm casings 2*b* and 2*a*, is upwardly opened so as to facilitate adjustment of clearance and maintenance about the inlet and exhaust valves 16*a* and 16*b* therein.

In this case, while the upper valve arm casing 2*b* is removed, the lower valve casing 2*a* is not removed from the cylinder head 1. Therefore, such removal of the high-pressured seal members 22 as to separate the inner pipes 21*a* from the outer pipes 21*b* is not required, thereby preventing fuel leak from the high-pressure-sealed portion of the fuel pipes 21 and facilitating treatments of the interior of valve arm room 5 such as maintenance thereof.

A gasket 55 is disposed between the cylinder head 1 and the lower valve arm casing 2*a* so as to seal the joint surface therebetween.

The lower valve arm casing 2*a* is formed at opposite side surfaces thereof into support portions 2*e* for supporting the valve arm shaft H. The valve arm shaft 11 is supported at both ends thereof by the respective support portions 2*e*, and at intermediate portions thereof by the valve arm shaft supporters 7 fixed on the top surface of the cylinder head 1 in the valve arm room 5.

The lower valve arm casing 2*a* is assembled together with the valve arm shaft 11 which is provided thereon with the valve arms 14, the fuel injection nozzle retainers 15 and the valve arm shaft supporters 7 and supported by the supporting portions 2*c*. Then, the assembly of the lower valve arm casing 2*a* is fixed onto the cylinder head 1, thereby reducing the total number of processes and improving the facility for assembly. Additionally, the number of valve arm shaft supporters 7 to be fixed to the cylinder head 1 can be reduced so as to reduce the total number of parts.

Alternatively, the valve arm casing 2 may be constituted as follows.

Figure 3:
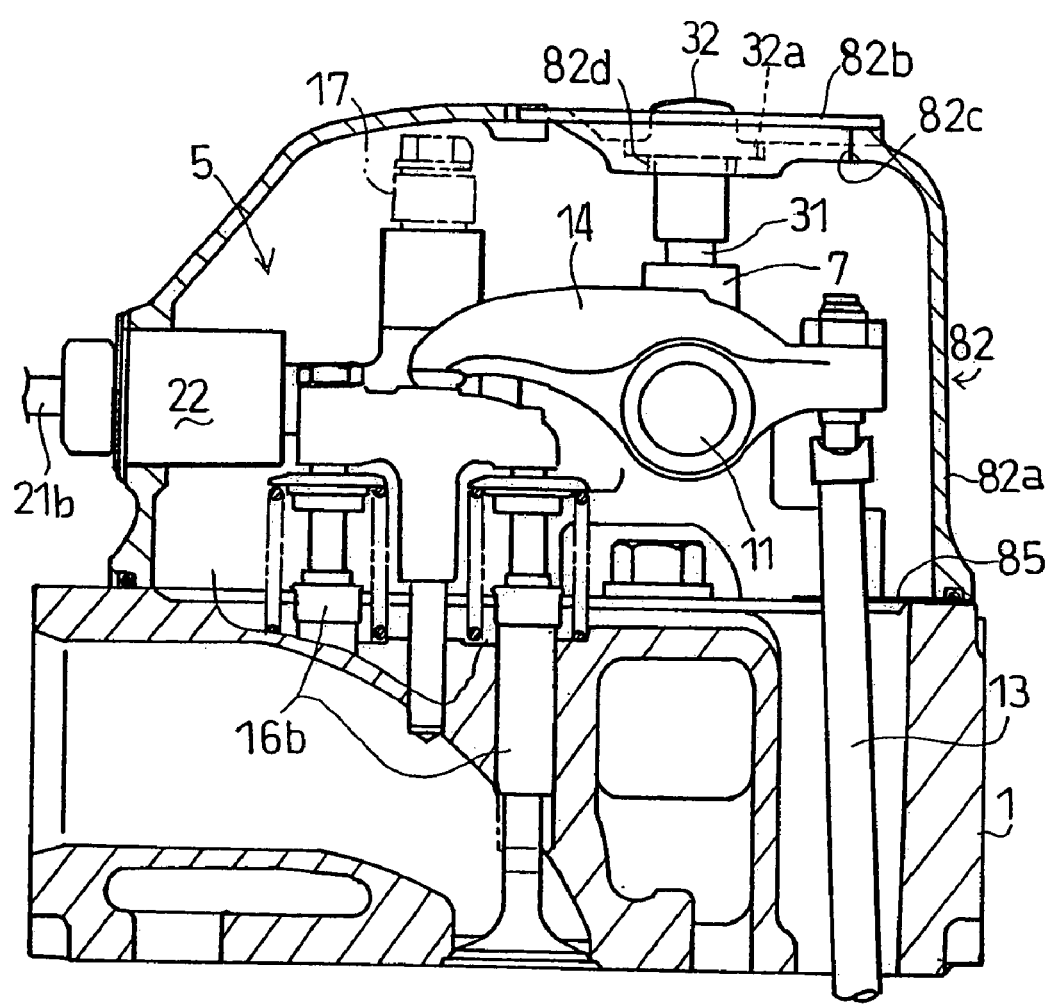
FIG. 3 is a sectional side view of a valve arm room according to another embodiment.

A valve arm casing 82, as shown in FIG. 3, comprises a casing body 82*a*, which is provided at the top surface thereof with an opening 82*c*, and a cap 82*b* for covering the opening 82*c*.

In this case, the cap 82*b* is bored with holes for fixation 82*d* at points corresponding to the valve arm shaft supporters 7. The retaining nuts 32 are inserted into the respective holes 82*d* from the outside above the caps 82*b*.

By tightly screwing the retaining nut 32 around the bolt 31, a flange 32*a* of the retaining nut 32, which is fit on the peripheral edge of the hole 82*d*, presses down the cap 82*b*, thereby fixing the casing body 82*a* together with the onto the cylinder head 1.

Namely, the casing body 82*a* is fixed onto the cylinder head 1 through the cap 82*b* which is pressed down by the retaining nuts 32 tightly fastened on the respective bolts 31.

Therefore, by loosening and removing the retaining nuts 32 from the respective bolts 31 and removing the cap 82*b*, the opening 82*c* above the valve arm room 5, which has been enclosed with the casing body 82*a* and the cap 82*b*, is upwardly opened so as to facilitate adjustment of clearance and maintenance about the inlet and exhaust valves 16*a* and 16*b* in the valve arm room 5.

In this case, while the upper valve arm casing 2*b* is removed, the lower valve casing 2*a* is not removed from the cylinder head 1. Therefore, such removal of the high-pressured seal members 22 as to separate the inner pipes 21*a* from the outer pipes 21*b* is not required, thereby preventing fuel leak from the high-pressure-sealed portion of the fuel pipes 21 and facilitating treatments of the interior of valve arm room 5 such as maintenance thereof.

Next, a structure for mounting the valve arms 14 to the valve arm shaft 11 will now be described.

Figure 4:
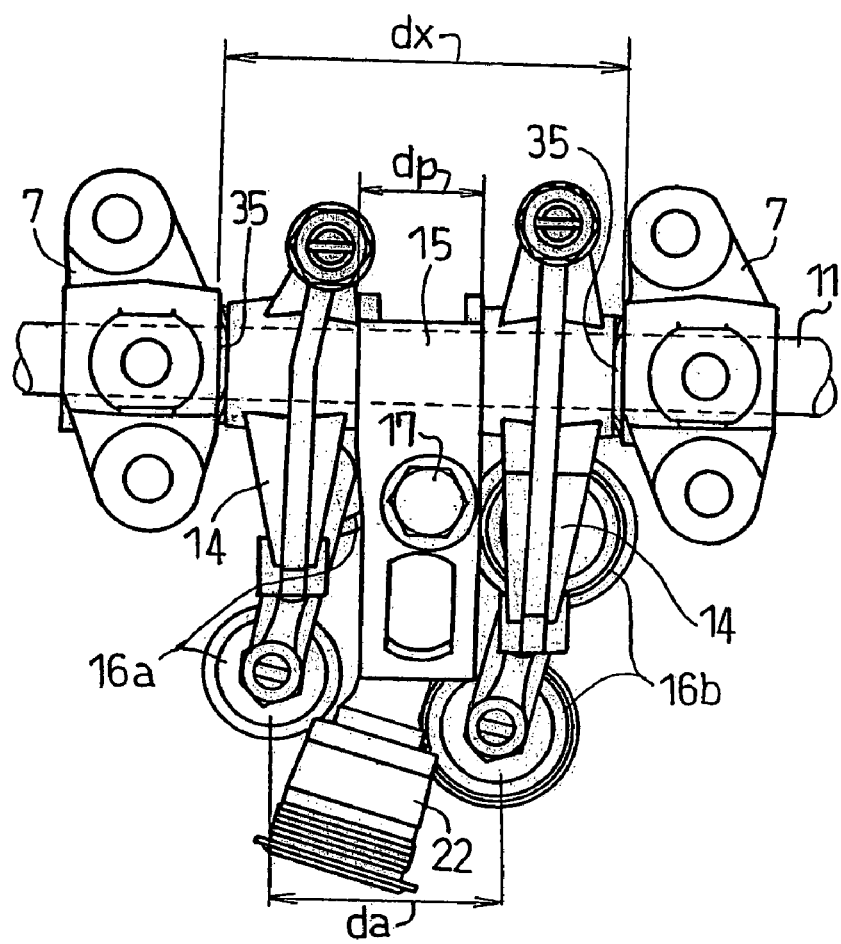
FIG. 4 is a plan view of a portion where valve arms are mounted.

Referring to a mounting portion of the valve arms 14 show in FIG. 4, the pair of valve arms 14: one for opening and shutting the pair of inlet valves 16*a*; and the other for opening and shutting the pair of exhaust valves 16*b*, are arranged between the valve arm shaft supporters 7. The fuel injection nozzle retainer 15 is arranged between the pair of valve arms 14 for inlet and exhaust valves 10*a* and 16*b*.

An energizing member 35, such as a wave washer, is fit on the valve arm shaft between the support member 7 and each of the valve arms 14. The valve arms 14 are pressed against the fuel injection nozzle retainer 15 by the respective energizing members 35.

A distance dx between the neighboring valve arm shaft supporters 7 is slightly longer than the total widths of the pair of valve arms 14 for inlet and exhaust valves 16a and t6b and the fuel injection nozzle retainer 15 so as to make a margin for facilitating attachment of the valve arms 14 and the fuel injection nozzle retainer 15. In this state, the energizing member 35 serving as a spacer is provided in a gap between the valve arm shaft supporter 7 and the valve arm 14 so as to fill up the gap.

A distance dp between the pair of valve arm 14: one for the pair of inlet valves 16a and the other for the pair of exhaust valves 16b is determined corresponding to an interval da between the pair of inlet valves 16a and the pair of exhaust valves 16b.

In this way, the valve arm shaft 11 also serves as a support member for supporting the fuel injection nozzle retainers 15 so that the fuel injection nozzle retainers 15 may be supported by the lower valve arm casing 2a without providing an additional support member in the valve arm room 5 for supporting the fuel injection nozzle retainers 15, thereby reducing the number of parts and saving a space for arranging the fuel injection nozzle retainers 15.

Figure 5:
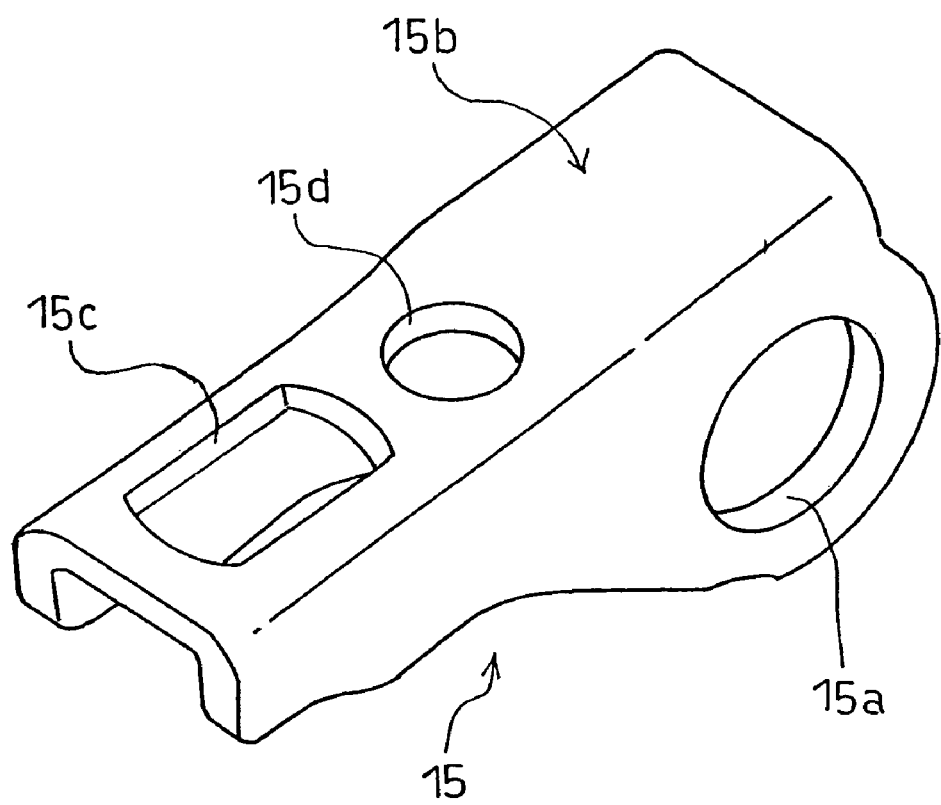
FIG. 5 is a perspective view of a fuel injection nozzle retainer.

The fuel injection nozzle retainer 15 which is supported by the valve arm shaft 11 is a thin plate member, as shown in FIG. 5, which is bent at both ends thereof so as to form supporting portions 15a. A remaining flat portion 15b of the thin plate member serving as the fuel injection nozzle retainer 15 is bored by holes 15c for retaining the fuel injection nozzle 17 and holes 15d for fixing the fuel injection nozzle retainer 15. Such a simple structure enables the fuel injection nozzle retainer 15 to be made of an economic metal plate so as to reduced costs.

As mentioned above, while each fuel injection nozzle retainer 15 together with the pair of valve arms 14 and the pair of energizing members 35 are put on the common valve arm shaft 11, the energizing members 35 energize the respective valve arms 14 toward the fuel injection nozzle retainer 15 so that the fuel injection nozzle 15 is pressed by the valve arms 14 in opposite directions. Namely, the energizing members 35 indirectly energize the fuel injection nozzle retainer 15 so as to generate a friction force between the fuel injection nozzle retainer 15 and each of the valve arms 14, thereby restricting rotation of the fuel injection nozzle retainer 15.

Accordingly, while the lower valve casing 2a is fit onto the cylinder head 1, the postures of fuel injection nozzle retainers 15 fit on the valve arm shaft 11 can he held so as to facilitate location of the fuel injection nozzle retainers 15, thereby improving the facility of assembly.

Figure 6:
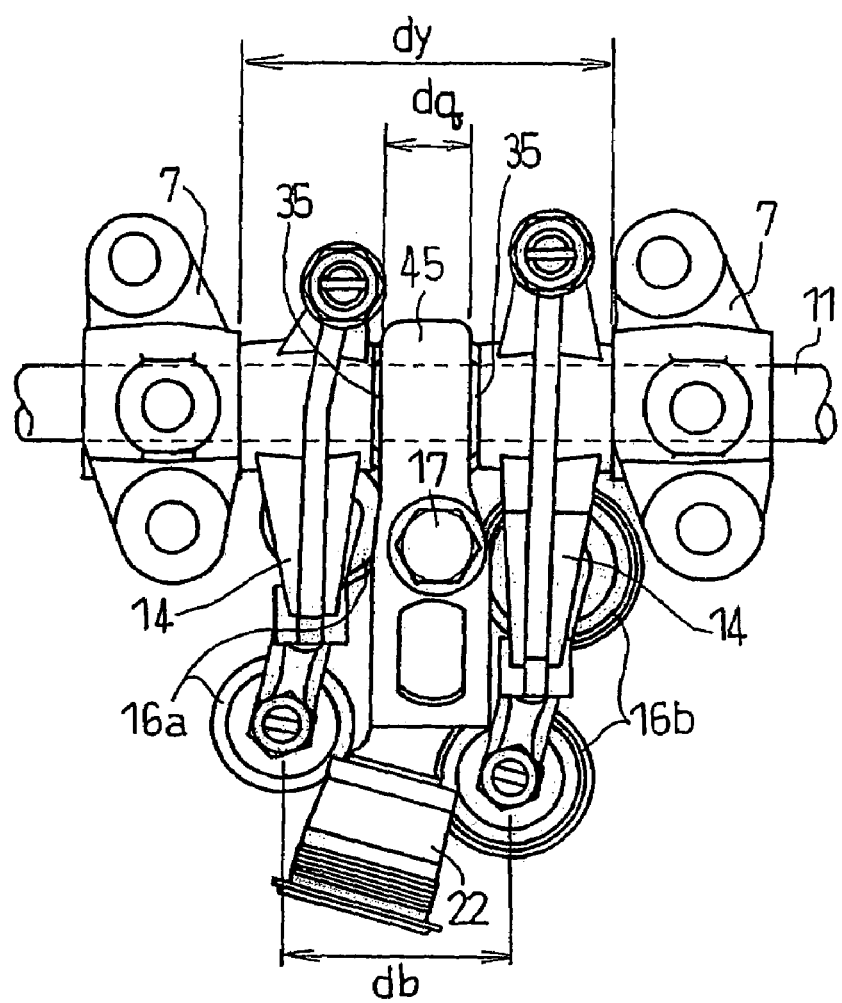
FIG. 6 is a plan view of a portion where valve arms are arranged in an engine whose cylinder boa pitch is different from that of the engine of FIG. 4.

FIG. 6 shows a mounting portion of the valve arms 14 in an engine whose cylinder boa pitch is shorter than that of the engine of FIG. 4. A distance dy between the valve arm shaft supporters 7 of FIG. 6 is shorter than the corresponding distance dx of FIG. 4. An interval db between he pair of inlet valves 16a and the pair of exhaust valves 16b is shorter than the corresponding interval da of FIG. 4.

Because the valve arms 14 of FIG. 6 are the same with those of FIG. 4, a width dq of a portion for supporting a fuel injection nozzle retainer 45 of FIG. 6 is shorter than the width dp of the portion for supporting the fuel injection nozzle retainer 15 of FIG. 4 so as to make the total width of the pair of valve arms 14 and the fuel injection nozzle retainer 45 of FIG. 6 shorter than the corresponding width dy.

An energizing member 35 is interposed between each of the valve arms 14 and the fuel injection nozzle retainer 45 so as to energize the valve arms 14 toward the valve arm shaft supporter 7.

According to the difference of cylinder boa pitch, the interval db between the limit of inlet valves 16a and the pair of exhaust valves 16b is different from the corresponding interval da. However, as mentioned above, the width dq of fuel injection nozzle retainer 45 is adjusted and the energizing members 35 are provided so that the interval between the valve arm 14 for the pair of inlet valves 16a and the valve arm 14 for the pair of exhaust valves 16b may coincide with the interval db.

In the cylinder boa pitch of FIG. 6 is larger than that of FIG. 4, the interval between the pair of valve arms 14 may be adjusted correspondingly.

In this way, in correspondence to the engines having respective cylinder boa pitches which are different from each other, the present valve arm room 5 is so constructed that the fuel injection nozzle retainers 15 and 45 having different widths are prepared and positions of the energizing members 35 fit on the valve arm shaft 11 supporting the fuel injection nozzle retainers 15 or 45 are changed so as to adjust each interval between the pair of valve arms 14 for the inlet and exhaust valves 16a and 16b to a value corresponding either the interval da or db. As a result, it is able to use the common valve arms 14 in spite of difference of cylinder boa pitch.

The fuel injection nozzle retainers 15 and 45 are made of inexpensive sheet metal, changing the form of fuel injection nozzle retainers so as to prepare the different shaped fuel injection nozzle retainers 15 aid 45 without changing the valve arms 14 made by casting can save costs for adjusting the intervals among the valve arms 14 in comparison with changing the form of valve arms 14.

Next, a structure for guiding the push rods 13 with the gasket 55 interposed between the cylinder head 1 and the lower valve arm casing 2a will now be described.

Figure 7:
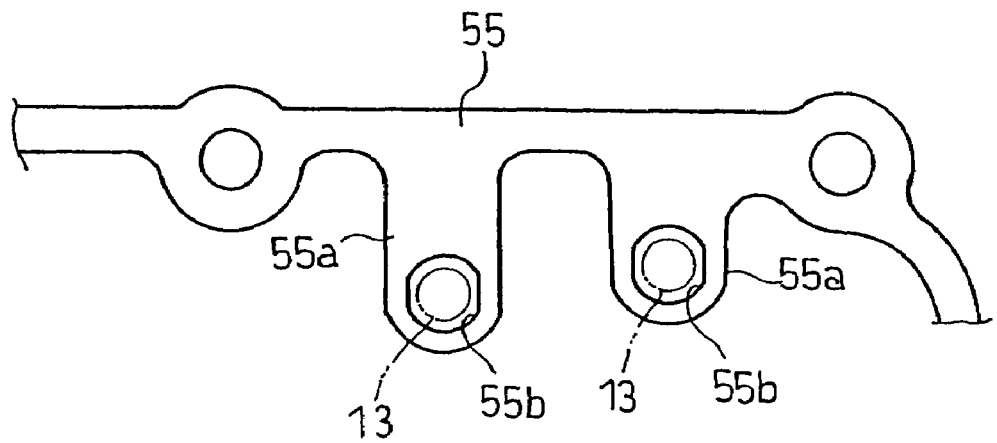
FIG. 7 is a plan view of a gasket in which guide holes for push rods are formed.

As shown in FIG. 7, the gasket 55 is formed with inwardly extending portions 55a corresponding to the respective push rods 13. In each of the extending portions 55a is bored a guide hole 55b applied for passing the push rod 1 therethrough.

Before lifting members in the valve arm room 5, the gasket 55 is placed on the cylinder head 1 and the push rods 13 are passed through the respective holes 55b.

Thus, the top ends of push rods 13 are guided by guide hole 55b so as to be fixed in location without tottering, thereby facilitating location of the valve arms 14 relative to the respective top ends of the push rods 13 and facilitating fitting of the valve arms 14.

The gasket 55 inherently interposed between the cylinder head 1 and lower valve arm casing 2a is used so as to save costs for guiding the push rods 13.

Figure 8:
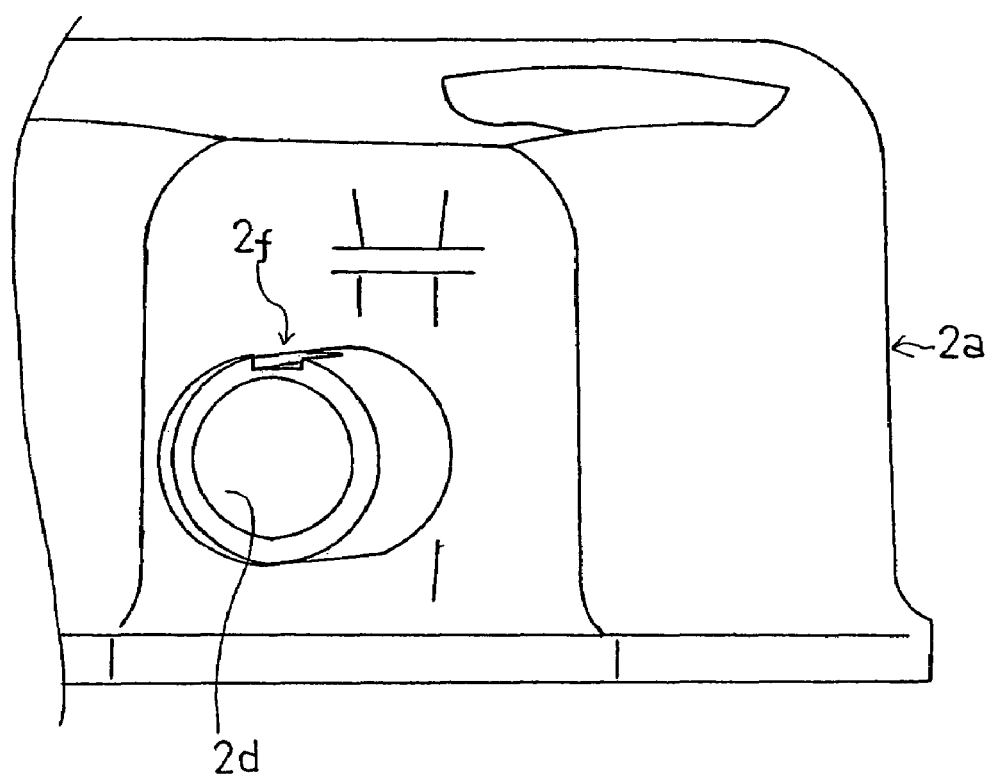
FIG. 8 is a side view of a fuel pipe hole with a notch where n the fuel pipe hole is applied for fitting a high-pressured seal member therein.

As shown in FIGS. 1 and 8, a notch 2f is formed on the outer edge of each fuel pipe hole 2d in which the high-pressure seal member 22 is fit.

In order to maintain the interior of valve arm room 5 removing the high pressure seal members 22 from the fuel pipe holes 2d is sometimes required. However, the high-pressure seal member 22 tightly fit to the outer end of fuel pipe hole 2d is hard to be removed.

Therefore, the present lower valve arm casing 2a is formed with the notches 2f formed on the respective outer ends of fuel pipe holes 2d so as to facilitate for removing the high-pressure seal members 22. For example, a tool may be previously inserted into the notch 2f so as to slightly pry out the high-pressure seal member 22 before removing it, thereby enhancing efficiency of the removing work.

Figure 9:
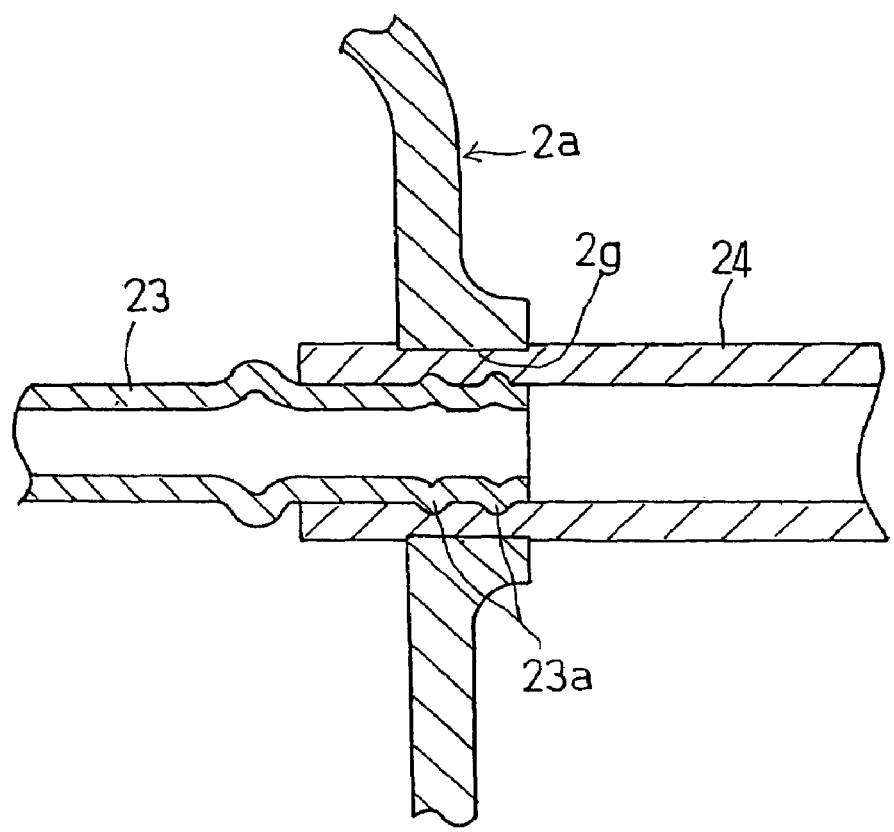
FIG. 9 is a side sectional view of a fuel back pipe in a through-hole formed in a lower valve arm casing.

Moreover, as shown in FIG. 9, the fuel back pipe 23 is extended to the outside of the valve arm casing 2a through the fuel back hole 2g formed in the side surface portion of lower valve arm casing 2a.

In the fuel back hole 2g, fuel back pipe 23 is connected to the outer fuel back pipe 24, and passes with the outer fuel back pipe 24 through the fuel back hole 2g. The fuel back pipe 23 is composed of a steel tube or so on, and the outer fuel back pipe 24 is an elastic hose-like member made of rubber, synthetic risen or so on.

Consequently, the outer fuel back pipe 24 is compressed and interposed between the fuel back hole 2g and the fuel back pipe 23 penetrating the fuel back hole 2g so as to be connected to the outer fuel back pipe 24 and to seal the gap between the fuel back pipe 23 and the fuel back hole 2g.

Accordingly, the outer fuel pipe 24, which is connected to the fuel back pipe 23 in the fuel back hole 2g, is a hose member for guiding excessive fuel from the fuel back pipe 23 outward from the valve arm room 5, and also serves as a seal member for sealing the space between the fuel back pipe 23 and the fuel back hole 2g.

A piping comprising the fuel back pipe 23 and the outer fuel back pipe 24 for returning surplus fuel penetrates the side surface of the lower valve arm casino 2a through the fuel back hole 2g.

Annular projections 23a are formed on the periphery of the fuel back pipe 23 in the fuel back hole 2g so as to prevent the fuel back pipe 23 from slipping out of the outer fuel back pipe 24.

Thus, the fuel back pipe 23 for returning surplus fuel outward from the fuel injection nozzles 17 penetrates the side surface of the lower valve casing 2a through the outer fuel back pipe 24 serving as a seal member so as to require no pipe joint screwed into the side surface of the lower valve arm casing 2a, thereby reducing the number of parts attached to the lower valve arm casing 2a. Also, the lower valve arm casing 2a requiring no process for making a female screw is formed simply so as to reduce the number of processes.

Moreover, the outer fuel pipe 24 connected to the fuel back pipe 23 serves as a seal member so as to enhance the reliability over fuel leak from the junction between the fuel back pipe 23 and the outer fuel back pipe 24.

Next, description will be given on a structure of a valve arm room of a 2-valve type engine wherein each cylinder has one inlet valve lend one exhaust valve.

Figure 10:
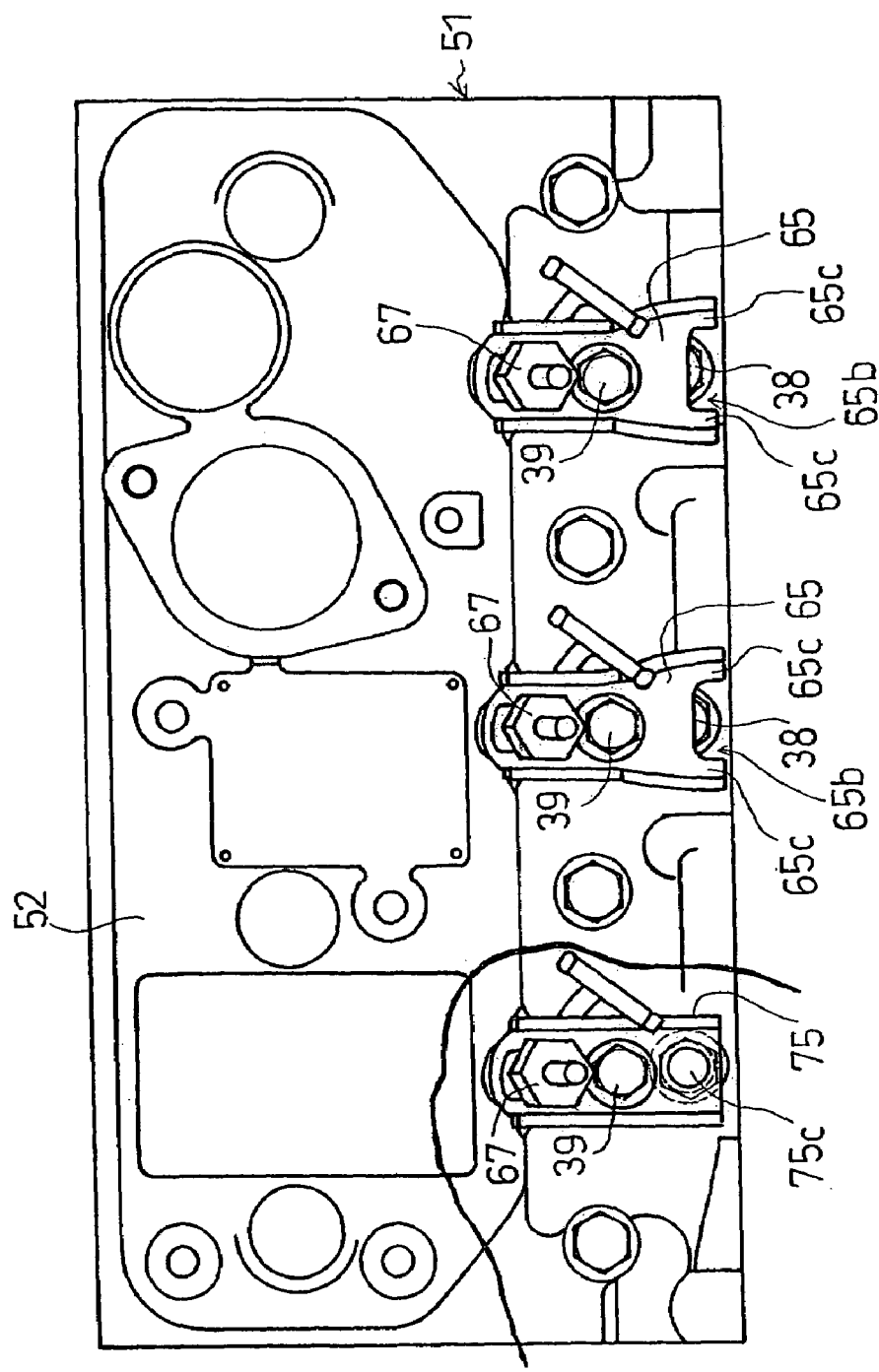
FIG. 10 is a plan view of a valve arm room of a 2-valve type engine with a device for retaining fuel injection nozzles according to the present invention.
Figure 11:
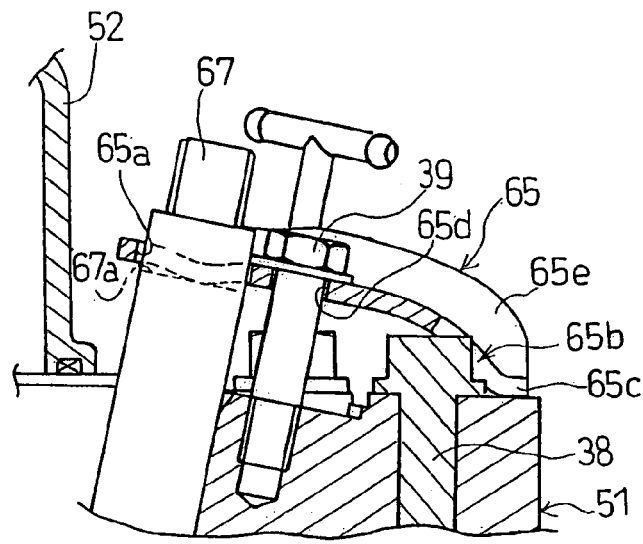
FIG. 11 is a sectional side view of a fuel injection nozzle retainer in the valve arm room of FIG. 10.
Figure 12:
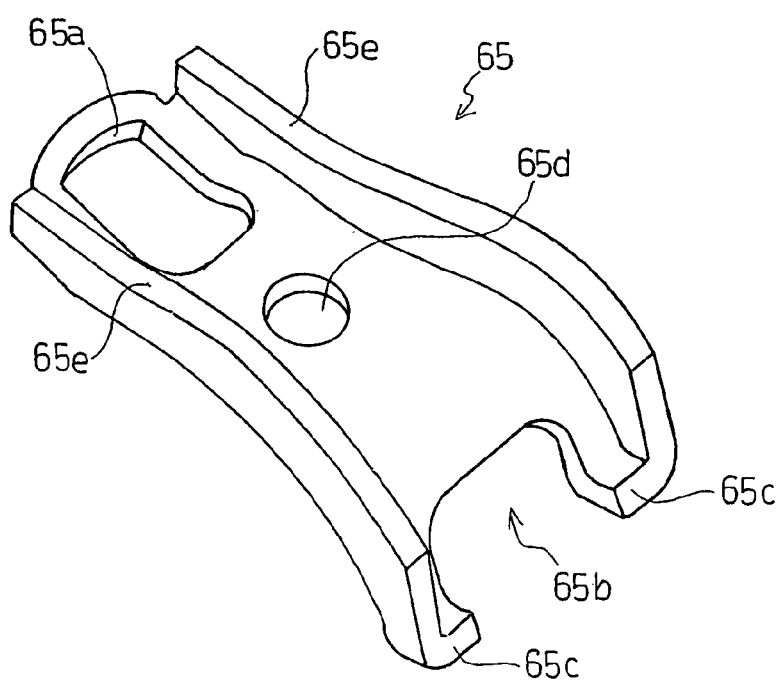
FIG. 12 is a perspective view of the same.

As shown in FIGS. 10 and 11, in a 2-valve type engine, a valve arm casing 52 is disposed on a cylinder head 51, and a valve arm room is constructed in the valve arm casing 52. Fuel injection nozzles 67 provided to respective cylinders are arranged out of the valve arm casing 52, and inserted into the cylinder head 51 through a top surface portion of cylinder head 51, which is not covered with the valve arm casing 52.

Fuel injection nozzle retainers 65 press down the respective fuel injection nozzles 67 to appointed places in the vertical direction so as to fix them in the cylinder head 51.

As shown in FIG. t2, the fuel injection nozzle retainer 65 is formed on a first end portion thereof with a notch 65b and a pair of legs 65c on both sides of the notch 65b. The fuel injection nozzle retainer 65 is bored at the substantially center portion thereof with a fixation hole, 65d for its fixation to the cylinder head 51. The fuel injection nozzle retainer 65s formed on an opposite second end portion thereof with a nozzle retaining hole 65a for pressing clown the fuel injection nozzle 67.

Each of the fuel injection nozzles 67 is upwardly inserted at the top portion thereof into the nozzle retaining hole 65a of each fuel injection nozzle retainer 65. A bolt 39 is downwardly inserted into the fixation hole 65d of each fuel injection nozzle retainer 65 and screwed into the cylinder head 51 so as to press down the second end portion of fuel injection nozzle retainer 65 while the pair of legs 65c abutting against the top surface of cylinder head 51 function its a fulcrum. Therefore, a fitting portion 67a of the fuel injection nozzle 67 comes to fit the peripheral edge of the nozzle retaining hole 65a so that the fuel injection nozzle 67 pressed substantially downward by the fuel injection nozzle retainer 65 is fixed in the. cylinder head 51.

In this case, although the head bolts 38 for fastening the cylinder head 51 onto the cylinder block are located below the respective first end portions of fuel injection nozzle retainers 65, the notches 65b of fuel injection. nozzle retainers 65, are located corresponding to the respective head bolts 38 so as to prevent the fuel injection nozzle retainers 65 from contacting with the head bolts 38.

Namely, by being formed with the notch 65b, each fuel injection nozzle retainer 65 straddles the head bolt 38 without abutting against the head bolt 38 so as to be fixed to the cylinder head 51.

The fuel injection nozzle retainer 65 is made of a thin place in which the nozzle retaining hole 65a, the notch 65b and the fixation hole, 65d are bored or notched. The pair of legs 65c of fuel injection nozzle retainer 65 are formed by bending the thin plate. Both ends of the thin plate in the shorter direction (lateral direction in FIG. 10) are bent to form a pair of reinforcement ribs 65e. The fuel injection nozzle retainer 65 constructed in such a simple manner may be made of inexpensive sheet metal.

The fuel injection nozzle retainer 65 is fastened at the substantially center thereof onto the cylinder head 51 by a bolt 39, and directly abuts at legs 65c thereof against the top surface of cylinder head 51 while the portion thereof between legs 65c straddles the head bolt 38 therebelow. Therefore, the fuel injection nozzle retainer 65 saves a space for its fixation to the cylinder head 5L mid requires no additional member for its support, thereby reducing costs.

Figure 13:
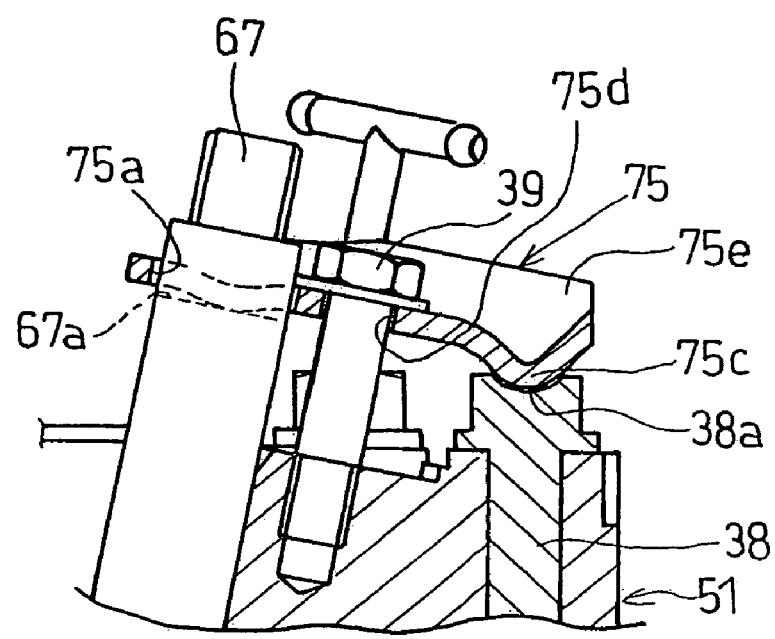
FIG. 13 is a sectional side view of a fuel injection nozzle retainer arranged in a valve arm room of 2-valve type engine according to another embodiment.

Alternatively, the fuel injection nozzle retainer may be composed such as a fuel injection nozzle retainer 75 shown in FIGS. 10 and 13.

The fuel injection nozzle retainer 75 is formed on a first end portion thereof with a downwardly projecting projection 75c. The fuel injection nozzle retainer 75 is bored at the substantially center portion thereof with a fixation hole 75d for its fixation to the cylinder head 51. The fuel injection nozzle retainer 75 is formed on an opposite second end portion thereof with a nozzle retaining hole 75a for pressing down the fuel injection nozzle 67, and the second end portion is bent at both (lateral in FIG. 10) ends thereof to form a pair of reinforcement ribs 75e.

The projection 75c of fuel injection nozzle retainer 75 abut, against the top head surface of each head bolt 38.

Each of the fuel injection nozzles 67 is upwardly inserted at the top portion thereof into the nozzle retaining hole 75a of fuel injection nozzle retainer 75. The bolt 39 is downwardly inserted into the fixation hole 75d of each fuel injection nozzle retainer 75 and screwed into the cylinder head 51 so as to press down the second end portion of fuel injection nozzle retainer 75 while the projection 75c abutting against the top surface of cylinder head 51 functions as a fulcrum. Therefore, the fitting portion 6a of the fuel injection nozzle 67 comes to fit the peripheral edge of the nozzle retaining hole 75a so that the fuel injection nozzle 67 pressed substantially downward by the fuel injection nozzle retainer 75 is fixed in the cylinder head 51.

In this case, the projection 75c abuts against the top head surface of each head bolt 38 so that each fuel injection nozzle retainer 75 may be supported at the first end portion thereof by the head bolt 38. Therefore, it is unnecessary to intake additional portions for supporting the fuel injection nozzle retainers 75 on the top surface of cylinder head 51, thereby further saving a space for arranging the fuel injection nozzle retainers 75. Also, no additional member for supporting the fuel injection nozzle retainers 75 is required, thereby reducing costs.

Furthermore, the top surface of each head bolt 38 against which the projection 75c abuts is dented to form a dented portion 38a, which is shaped corresponding to the projection 75c, so that the fuel injection nozzle retainer 75 may be fixed while the projection 75c is fit into the dented portion 38a.

Due to this, portions of the respective fuel injection nozzle retainers 75 abutting against the cylinder head 51 do not slip relative to the cylinder head 51, thereby ensuring stable fixation of the fuel injection nozzle retainers 75 to the cylinder head 51 for surely mounting the fuel injection nozzles 67.

The fuel injection nozzle retainer 75 is simply made of a thin plate formed with a nozzle retaining hole 75a, the projection 75c, the fixation hole 75d, and the pair of reinforcement ribs 75e. The fuel injection nozzle retainer 75 constructed in such a simple manner may be made of inexpensive sheet metal.

INDUSTRIAL APPLICABILITY

An understood from the above description, the fuel injection nozzle of an engine such as a diesel engine according to the present invention is applicable to inject fuel into a combustion chamber of each cylinder of the engine.

What is claimed is:

1. A structure for retaining a fuel injection nozzle of an engine, comprising:
    a plurality of exchangeable fuel injection nozzle retainers having different widths, one of which is selected for fixing the fuel injection nozzle;
    valve arms disposed at each side of the selected fuel injection nozzle retainer;
    an energizing member disposed next to at least one valve arm; and
    a support shaft which supports the selected fuel injection nozzle, the valve arms, and the energizing member;
    wherein the selected fuel injection nozzle retainer is energized against the valve arms by an energizing force of the energizing member.

2. A structure for retaining a fuel injection nozzle of an engine as set forth in claim 1, wherein, the valve arm for an inlet valve is arranged on one side of the selected fuel injection nozzle retainer, wherein the valve arm for an exhaust valve is arranged on the other side of the selected fuel injection nozzle retainer, and wherein an interval between the inlet valve arm and the exhaust valve arm is adjustable by selecting one of the exchangeable fuel injection nozzle retainers having different widths.

3. A structure for retaining afuel injection nozzle of an engine, comprising:
    a fuel injection nozzle retainer for fixing a fuel injection nozzle into a cylinder head, which is formed on a first end portion thereof with a notch, wherein the notch is placed around a head bolt fastening the cylinder head onto a cylinder block, and the fuel injection nozzle retainer straddles the head bolt.

4. A structure for retaining a fuel injection nozzle of an engine, comprising:
    a fuel injection nozzle retainer for fixing a fuel injection nozzle into a cylinder head,
    wherein the fuel injection nozzle retainer is supported at one end thereof by a head bolt fastening the cylinder head onto a cylinder block.

5. A structure for retaining a fuel injection nozzle of an engine as set forth in claim 4, wherein a projection formed on the end of the fuel injection nozzle retainer is fit into a dented top of the head bolt.

6. A structure for retaining a fuel injection nozzle of an engine, comprising:
    a fuel pipe penetrating a valve arm casing, the valve arm casing being arranged above a cylinder head so as to contain valve arms and a fuel injection nozzle,
    wherein the fuel injection nozzle is supplied with fuel through the fuel pipe,
    and the valve arm casing is provided at a portion thereof penetrated by the fuel pipe with a seal member for sealing the fuel pipe and with a notch for making a gap between the seal member and the penetrated portion of the valve arm casing for receiving a tool for removing the seal.

7. A structure for retaining a fuel injection nozzle of an engine, according to claim 1, further comprising:
    a second energizing member, one energizing member disposed next to each valve arm.

* * * * *